United States Patent [19]
Martin

[11] Patent Number: 4,637,255
[45] Date of Patent: Jan. 20, 1987

[54] NON-PLANAR RING LASER ACCELEROMETER

[75] Inventor: Graham J. Martin, Canoga Park, Calif.

[73] Assignee: Litton Systems, Inc., Beverly Hills, Calif.

[21] Appl. No.: 814,878

[22] Filed: Dec. 30, 1985

[51] Int. Cl.⁴ ............................................. G01P 15/08
[52] U.S. Cl. ................................. 73/517 R; 356/349; 356/351
[58] Field of Search .......................... 73/516 R, 517 R; 356/349, 351; 372/94

[56] References Cited

U.S. PATENT DOCUMENTS

| | | | |
|---|---|---|---|
| 4,048,859 | 9/1977 | Babcock | 73/516 R |
| 4,229,106 | 10/1980 | Dorschner et al. | 356/351 |
| 4,422,331 | 12/1983 | Walker | 73/517 R |

*Primary Examiner*—Stewart J. Levy
*Assistant Examiner*—John E. Chapman, Jr.
*Attorney, Agent, or Firm*—Elliott N. Kramsky

[57] ABSTRACT

An instrument for measuring acceleration as a function of reciprocal mode splitting within a non-planar rising cavity. A glass block includes an internal non-planar cavity. The block includes orthogonal bending axes. A proofmass atop the block causes flexure about such axes upon imposition of acceleration force along a preselected sensitive axis. The resulting deformation results in detectable changes in the cavity aspect ratio that provide a measure of acceleration.

9 Claims, 4 Drawing Figures

NON-PLANAR RING LASER ACCELEROMETER

BACKGROUND

1. Field of the Invention

The present invention relates to inertial navigation instruments. More particularly, this invention pertains to an accelerometer wherein the force experienced by a proofmass affects the modes of light within a non-planar optical cavity.

2. Description of the Prior Art

A large variety of accelerometers exists. While a wide range of shapes and sizes is possible, each works on the principle of the inertial "pushing back" of a known mass in response to an externally applied acceleration force. While this common principle relates to all accelerometers, mechanical, electromechanical and those formed of silicon semiconductor material, methods and apparatus for measuring the amount of acceleration experienced by the proofmass of the system vary considerably. For example, in force-rebalance systems wherein the proofmass is maintained in a null or near-null position, the amount of current required to actuate the system's torquers to maintain a null position provides an indication of the amount of acceleration force.

The accelerometer often forms a portion of an inertial navigation unit or system. In such a system, rate measuring gyroscopes may also be employed, often serving to stabilize the system's accelerometers. A significant advance in the gyroscope art has been the development of the ring laser gyroscope. In the ring laser gyroscope, two monochromatic laser beams rotate in opposite directions in a closed optical path. Angular movement of the gyroscope (and the body to which it is fixed or "strapped down") about its sensing axis results in an effective path length change for each beam, increasing the path for the beam travelling in the direction of the angular movement and decreasing the path of the beam travelling in the opposite direction by the same amount. As a result, the wavelengths of the two beams will change accordingly and this is reflected in changes in the beams' frequencies. The resulting frequency differential is proportional to angular rate.

The increase use of such laser technology in inertial navigation, coupled with the fact that such technology is physically quite different from existing accelerometer technologies, points to the potential future advantages that may accrue from the development of a laser accelerometer that is generally compatible with the laser gyro technology. Such advantages include common manufacturing technology, the potential fabrication of totally integrated laser inertial navigation systems on a single optical block, the inherently wideband operation of laser inertial sensors and the like. These potential benefits have in the past prompted attempts to develop a laser accelerometer. Generally, such attempts have featured an implementation of Hooke's Law wherein amorphous material is inserted into a resonant cavity and the stress-induced birefringence therein measured by observing the beat frequencies between two polarizations lasing in the cavity. Such work is described in U.S. Pat. No. 4,048,859 of Gary D. Babcock entitled "Laser Accelerometer."

The insertion of intracavity elements necessarily complicates the manufacture of precision optical instruments. More significantly, such inserted elements are lossy, resulting in increased energy consumption, lessening the efficiency and accuracy of the instrument.

SUMMARY OF THE INVENTION

The present invention overcomes the foregoing and other problems by providing a non-planar ring laser accelerometer having no lossy intracavity elements. The accelerometer includes a block. A non-planar cavity is located within the block, such cavity comprising a plurality of substantially-straight intersecting cavity segments. Means are provided for generating at least one rotating beam of laser light within such cavity. A mirror is arranged adjacent each intersection of cavity segments to direct light between the intersecting segments. A proofmass contacts the block so that the block is elastically deformed in a predetermined manner in response to acceleration force. Finally, means are provided for determining the acceleration force as a function of the light within the cavity.

The preceding and other advantages and features of the present invention will become further apparent and appreciated from the detailed description that follows. This description is accompanied by a set of drawing figures that illustrate the invention. Numerals indicate the features of the invention, like numerals referring to like features of the invention throughout.

DETAILED DESCRIPTION

Figure 1:
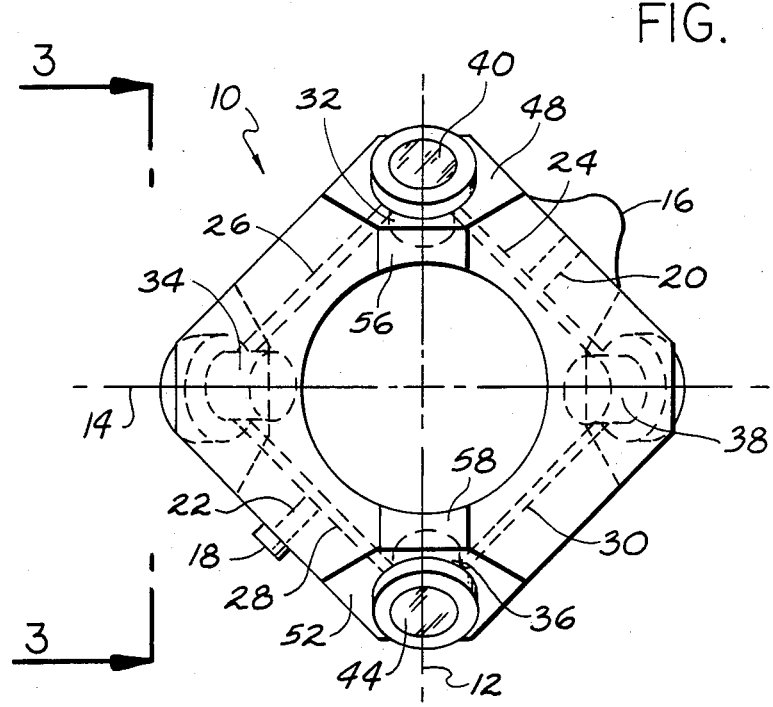
FIG. 1 is a top view of the block of an accelerometer in accordance with this invention.

Turning now to the drawings, FIG. 1 is a top plan view of the accelerometer block of the present invention with proofmass and certain optical and electronic apparatus removed for purposes of clarity. The accelerometer block 10 may be of glass ceramic or like material characterized by a low coefficient of thermal expansion. Representative materials for this purpose include Pyrex and the glass ceramics known by the trademarks "Cer-Vit" and "Zerodur".

The block 10 is fabricated and designed in such a manner that at least one bending axis is defined in the plane of the drawing. As shown in the illustrated block 10, orthogonal axes or "hinges" 12 and 14 define lines of flexure of the block 10 in the plane of FIG. 1. These axes, which arise from a combination of the geometry of the block (shown more clearly in FIGS. 2 and 3) and the location of a proofmass of the accelerometer enable the block to deform in a preselected manner upon the imposition of an acceleration force along the sensitive axis of the accelerometer. As will be seen below, this deformation produces detectable changes in the modes of laser light within an internal, non-planar ring cavity. These changes, when detected, provide an indication of acceleration along the sensitive axis perpendicular to the plane of FIG. 1 of the accelerometer.

The block 10 is somewhat donut-shaped with a generally orthogonal perimeter and round inner boundary. Such geometry permits the creation of the above-referenced bending axes. Further, the shape of the block 10 permits the location of an out-of-plane optical cavity comprising four equal cavity segments arranged into a so-called "puckered square" shape. An optical path is achieved about the non-planar shape by the mounting of the required electrodes and mirrors for creating and sustaining a laser gain medium within the cavity and directing the light modes about the preselected optical path.

Referring with more particularity to the design of the block 10, a cathode 16 and an anode 18 of conventional design as known in the ring laser art are fixed by well-known methods and means to opposite sides of the octagonal periphery. As will be seen from the discussion that follows, a single anode is sufficient for this instrument, unlike the pair generally utilized to overcome Langmuir flow effects in a ring laser gyroscope which, unlike the present instrument, measures counter-rotating laser beams. Rather, it will be seen that the ring laser accelerometer, which relies upon Hooke's Law rather than the Sagnac effect, as does the ring laser gyroscope, relies upon the measurement of laser beams that traverse the internal square cavity of the block 10 in a single direction. No intracavity elements are needed to generate two polarization modes, such as right and left circular polarization modes, which are distinct in the sense that the two modes receive different phase shifts in a cavity "round trip" and thus lase at different frequencies. The two modes are utilized for the measurement of acceleration force. As is well known, this is a consequence of the non-planar shape of the internal lasing cavity.

Passageways 20 and 22 within the block 10 provide communication between the lasing cavity and the cathode 16 and the anode 18 respectively for establishing a laser gain medium therein. The optical cavity comprises four intersecting cavity substantially straight segments 24, 26, 28 and 30. Cylindrical wells 32, 34, 36 and 38 are provided adjacent the regions of intersection of the segments. Cavity mirrors 40, 42, 44 and 46 for directing the laser modes about the out-of-plane optical cavity are fixed to planar mounting surfaces 48, 50, 52 and 54 formed in the outer surface of the block 10. The method and means for fixing such mirrors to an optical block 10 are well known in the ring laser gyroscope and related arts.

Additional planar regions 56 and 58 are formed atop the block 10 for locating and stabilizing a proofmass thereon. The total arrangement of the accelerometer, including the required proofmass for interacting with the optical block 10, will become further apparent from the succeeding figures and accompanying discussion.

Figure 2:
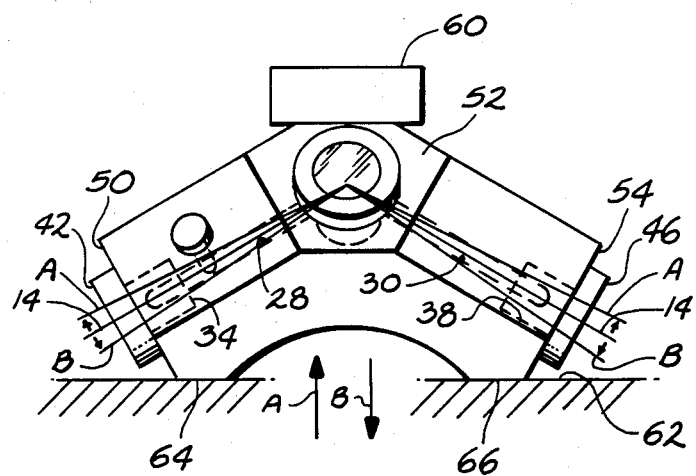
FIG. 2 is an elevation view of the accelerometer block taken at line 2—2 of FIG. 1 that illustrates the flexure of the block about a first axis in response to acceleration force.
Figure 3:
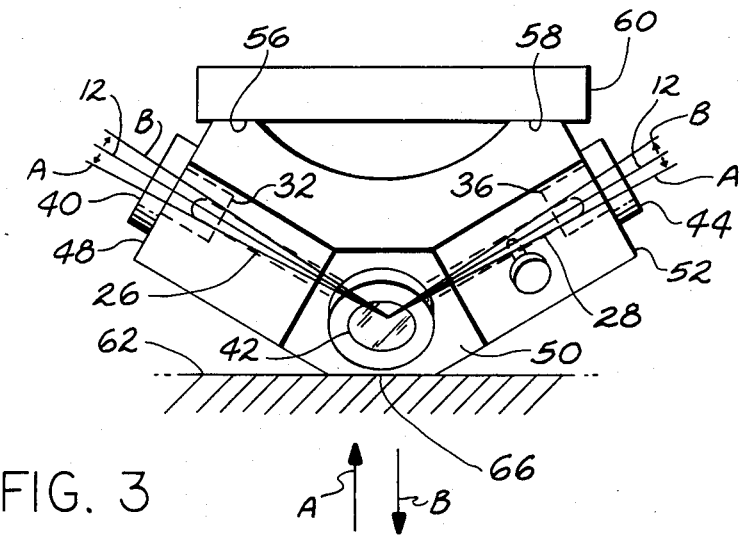
FIG. 3 is an elevation view of the accelerometer block taken at line 3—3 of FIG. 1 that illustrates the flexure of the block about a second, orthogonal axis in response to acceleration force.

FIGS. 2 and 3 are side elevation view of the accelerometer block of the invention, including views of the block 10 taken from the orthogonal directions as indicated on FIG. 1. As can be seen by comparison of the views of FIGS. 2 and 3, the block accommodates the non-planar optical cavity comprising the cavity segments 24, 26, 28 and 30 already discussed with reference to FIG. 1. The octagonal perimeter shown in the preceding figure comprises adjacent planar surfaces that rise and fall as one makes sequential observations of the side of the block. The round inner boundary of the donut-shaped block 10 is reflected in upwardly and downwardly curved apertures at the bottom and the top of the block 10 as shown in the views of FIGS. 2 and 3 respectively.

A mass 60 of known value is positioned or fixed to the block 10 at the above-referenced planar regions 56 and 58. The mass 60 acts as an inertial proofmass would in other accelerometer arrangements. That is, an acceleration force acting upon the mass 60 along a predetermined sensitive axis of the instrument causes it to transmit an indication of its magnitude to an output sensing means. Such a sensing means is discussed in detail with reference to FIG. 4. In the event that the body 62 to which the sensor of the invention undergoes acceleration, any acceleration force component along a sensitive axis of the instrument produces a minute, measurable, elastic deformation in accordance with Hooke's Law. The magnitude of the force for causing this deformation is equal to ma, where a is the magnitude of acceleration along the sensitive axis of the accelerometer and m is the mass of the proofmass 60.

As shown in FIGS. 2 and 3, the bottom of the block 10 is fixed or "strapped down" to a body 62 whose acceleration is to be measured. Planar regions 64 and 66 forming "feet" at the bottom of the block 10, corresponding to the planar regions 56 and 58 for accommodating the proofmass 60 atop the block 10, are provided for facilitating this mode of affixation of the instrument to the body 62.

Arrows A and B indicate upward and downward accelerations respectively of the body 62 along the sensitive axis of the accelerometer. The corresponding numeral indicates, in greatly exaggerated scale, the resulting elastic changes in the shape of the accelerometer block 10. Such changes are shown by the changes in the inclinations of the orthogonal axes 12 and 14. The changes in the shape of the block 10 produce corresponding changes in the light path of the out-of-plane optical cavity within the block 10. As seen in FIG. 2, the slopes of the downwardly-sloping cavity segments 28 and 30 become steeper and flatter during downward and upward acceleration, respectively. Likewise, the slopes of the upwardly-sloping cavity segments 26 and 28 become flatter and steeper during upward and downward accelerations.

Figure 4:
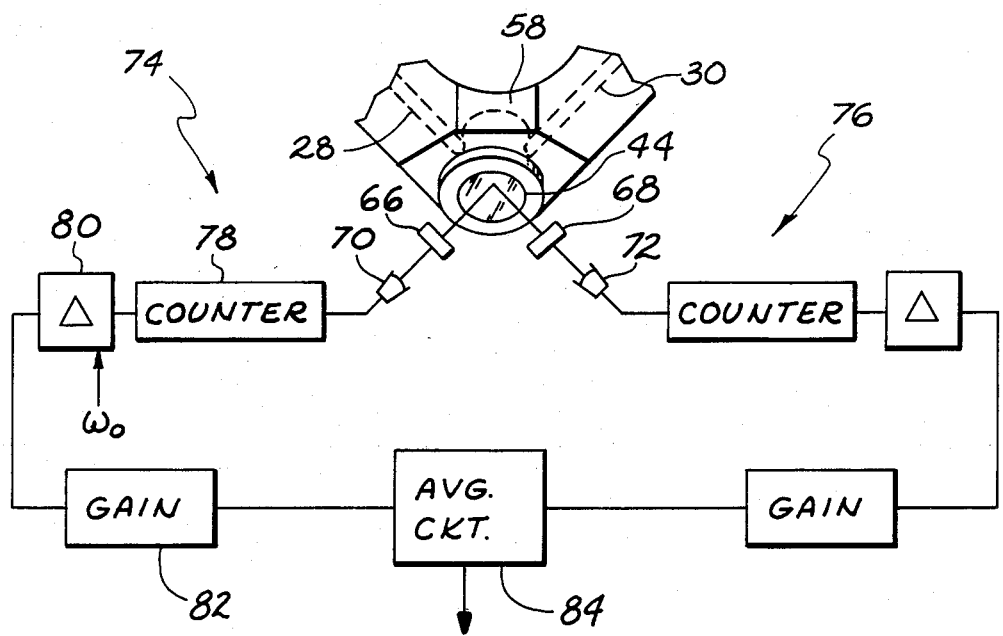
FIG. 4 is a partial view of the block of the invention and associated output acceleration-measurement electronics.

The deformations of the accelerometer body 10 are detected by the opto-electrical sensor apparatus of the invention to enable the instrument to provide acceleration data. FIG. 4 includes a schematic diagram of the output electronics for ascertaining the amount of acceleration force detected by the accelerometer including the proofmass 60 and the block 10. The instrument, as has been shown, is responsive to any acceleration force including a component directed along a sensitive axis by elastically deforming. As will be discussed, such deformations effect the amount of reciprocal frequency splitting between the (right and left circularly polarized) modes of the laser beam generated within the non-planar ring cavity of the block 10.

A portion of the light within the cavity is transmitted through the partially-transmissive output mirror 44 and linear polarizer-filters 66 and 68 to the photodetectors 70 and 72 respectively.

The electrical signals generated by the photodetectors 70 and 72 are applied to clockwise beam processing circuitry 74 and to counterclockwise beam processing circuitry 76 respectively. Each of the beam processing arrangements is essentially identical and, hence, detailed discussion will proceed solely with reference to the clockwise beam processing circuitry 74. As will become apparent form the following discussion, the essential operation of the accelerometer of the invention does not require that the cavity support counterrotating lasing beam modes. Rather, comparison of the frequencies of the right and left circularly polarized modes of a single beam direction is adequate for accurate measurement of an acceleration force. The arrangement of FIG. 4, which offers the possibility of utilizing the acceleration information contained in two counterrotating beams, permits the averaging of these two acceleration values to thereby nullify the effect of stray local magnetic fields that might otherwise introduce biases into the instrument reading.

Referring now to the arrangement comprising the clockwise beam processing circuitry 74, the two circularly polarized modes of the clockwise output beam are polarized so that the circularly polarized modes can be heterodyned together and filtered to produce an optical signal whose spectrum corresponds to the difference in frequency between the left and right circularly polarized modes of the clockwise beam within the nonplanar cavity of the block 10 so that an electrical signal is provided by the photodetector 70 thus contains this optical information. The photodetector 70, which may be an avalanche diode or like commercially available apparatus, should be capable of detecting tens-of-Megahertz range frequencies, as the reciprocal splitting between the beam modes may be expected to fall into this category.

The output of the photodetector 70 is a sinusoidal electrical signal whose frequency is equal to the amount of reciprocal splitting between the circularly polarized modes comprising the clockwise beam. This signal is input to a counter 78, including apparatus, such as a Schmitt trigger, for converting the input sinusoid into a corresponding pulse train. The counter is reset after a preselected sampling period of duration T and the number of beats counted during the period read out and applied to a difference circuit 80 that subtracts the value $\omega_o$, which corresponds to the amount of reciprocal splitting between the polarization modes at the nominal (unstressed) aspect ratio, $s_o$, (initial ratio of height to length of a cavity segment) of the nonplanar lasing cavity of the block 10.

The change in the beat frequency $\Delta f$, is input to a gain element 82 that multiplies the change to provide a corresponding value of the change in acceleration, $\Delta a$. Applicant has determined that this transformation occurs in accordance with the following relationship:

$$\Delta a = \frac{1}{km} \frac{2\pi \Delta f}{16} \frac{L}{c} (1 + S^2)$$

Where:
c/L=cavity free spectral range;
m=proof mass;
s=cavity aspect ratio (essentially constant, in terms of the magnitude of the other values in the equation, throughout deformation when f is expressed in Hz); and
k=a constant dependent upon the Young's modulus and the shape of the block 10.

Like processing is done to the counterrotating modes, if lasing within the cavity, by the counterclockwise beam processing circuitry 76. As mentioned, the circuitry 76 is essentially the same as the clockwise beam processing circuitry 74. The outputs (acceleration values) as derived from the two counterrotating beams are applied to an averaging circuit 84. As mentioned above, the circuit 84, which provides a "composite" value, improves the accuracy of the accelerometer by removing undesired bias from the acceleration measurement that may reflect the presence of stray magnetic fields acting on the gain plasma.

Thus, it is seen that new and improved instrumentation has been brought to the inertial measurement art by the present invention. By utilizing the teachings of this invention one may realize the broadband operation that was formerly restricted to rate measurement in the field of acceleration detection. Unlike prior art attempts, the present invention, which relies upon a non-planar configuration and circularly-polarized modes does not suffer from the disadvantages associated with the introduction of lossy intracavity elements. The achievement of an optical accelerometer offers economy of manufacture over more complex mechanical configurations while offering the possibility of integration with the ring laser gyroscope.

While this invention has been described with reference to its presently preferred embodiment, it is by no means so limited in scope. Numerous variants, including, for example, the use of a laser diode pumped Nd YAG gain medium, are foreseen. Rather, this invention is entitled to the full coverage defined by the following set of claims and all equivalents thereof.

What is claimed is:
1. An accelerometer comprising, in combination:
   (a) a block;
   (b) a non-planar cavity within said block;
   (c) said cavity comprising a plurality of substantially straight intersecting segments;
   (d) means for generating at least one rotating beam of laser light within said cavity;
   (e) a mirror arranged adjacent each of said cavity intersections to direct light between said intersecting segments;
   (f) a proofmass contacting said block so that said block is elastically deformed in a predetermined manner in response to acceleration force; and
   (g) means for determining said acceleration force as a function of the light within said cavity.
2. An accelerometer as defined in claim 1 wherein said means for generating at least one rotating beam of laser light within said cavity further includes means for generating two distinctly polarized modes in said at least one rotating beam of laser light.
3. An accelerometer as defined in claim 2 wherein said means for determining said acceleration force as a function of the light within said cavity further comprises means for measuring the amount of reciprocal frequency splitting of said at least one rotating beam of laser light.
4. An accelerometer as defined in claim 3 wherein said cavity includes four segments.
5. An accelerometer as defined in claim 4 further characterized in that said block is a puckered square shape.
6. An accelerometer as defined in claim 5 wherein said block further comprises two orthogonal bending axes.
7. An accelerometer as defined in claim 6 having a sensitive axis that is orthogonal to each of said bending axes.
8. An accelerometer as defined in claim 7 wherein said proofmass is located atop said block.

9. An accelerometer as defined in claim 8 further including:
- (a) two counterrotating beams of light within said cavity, each of said beams including two distinctly polarized modes; and
- (b) means for averaging the amount of acceleration force determined in accordance with the amount of reciprocal splitting of each of said counterrotating laser beams.

* * * * *